UNITED STATES PATENT OFFICE.

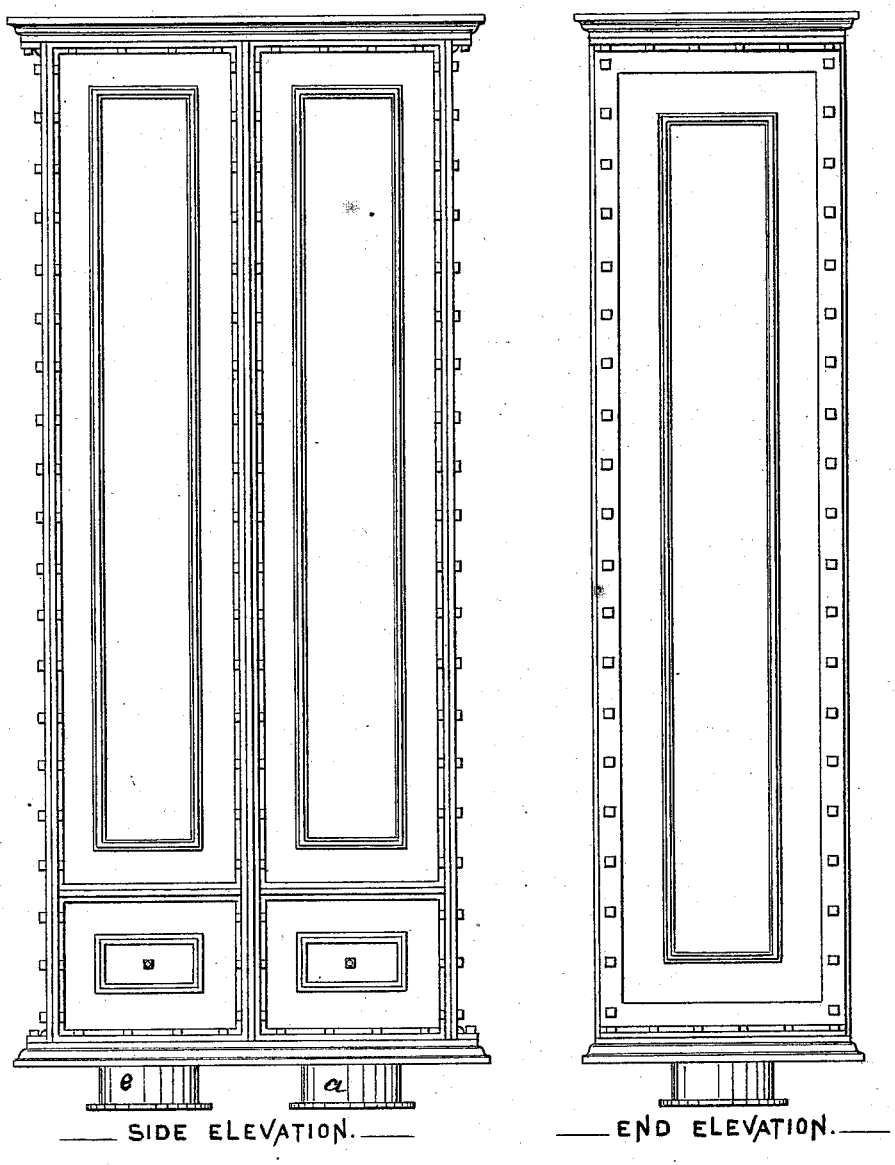

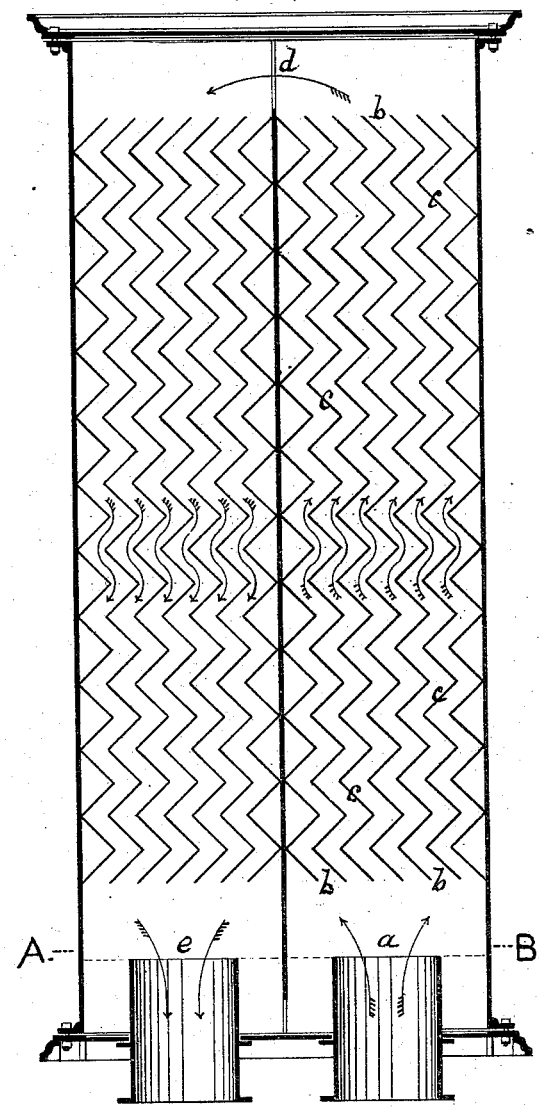
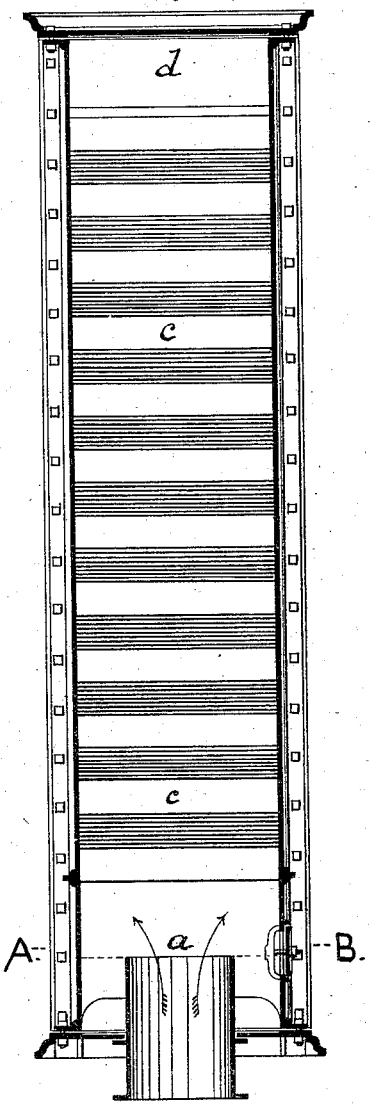
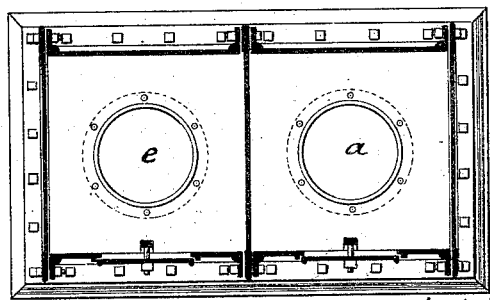

CHARLES V. SMITH AND WILLIAM FARMER, OF NEW YORK, N. Y.

IMPROVEMENT IN APPARATUS FOR PURIFYING ILLUMINATING-GAS.

Specification forming part of Letters Patent No. 163,339, dated May 18, 1875; application filed February 15, 1875.

*To all whom it may concern:*

Be it known that we, CHARLES VANDERVOORT SMITH and WILLIAM FARMER, both of New York, in the county and State of New York, have invented a certain new and useful Apparatus for Purifying Illuminating-Gas, of which the following is a specification:

In the ordinary method of purifying illuminating-gas, the condensers are made with a large amount of surface exposed to the cooling influence of the atmosphere or water, in its passage over which the volatile results of the distillation from the retorts are reduced in temperature as rapidly as possible. A long series of pipes are usually employed, that are placed either in a vertical or horizontal position, and are sometimes with their surfaces in sinuous curves, and provided with corrugated plates, in its passage over which the volatile matter may be effectually condensed or freed from the water and tarry matter or heavy hydrocarbons that have been distilled from the coal or other material in the retorts, and which cannot be conveyed or distributed with the fixed gas. The scrubbers are generally made either cylindrical or square, and from ten to seventy-five feet high, and these shafts are usually filled in with wooden or iron slats, or coke, earthenware, stones, or brushwood. Water is let in on the top and uniformly distributed over the filling, and gradually descends through it to the bottom of the scrubber. The gas, in its passage up through the shaft, is supposed to be effectually "scrubbed," and freed from ammonia and other impurities. In cooling and condensing all the volatile matter together, some of the lighter hydrocarbons are combined and held by the tar and other heavy matter, and the gas is deprived of volatile and vaporous matter, which is valuable for illuminating purposes If it be true, as it is believed to be, that the gas owes its illuminating power chiefly to the vapors of hydrocarbons, and that a large amount of these vapors will be held by ordinary gas in solution, or otherwise in combination, at the temperatures at which it is distributed, it may readily be seen that the condensation and removal of these useful vapors with the tar and water is a serious loss, and unnecessary waste in the manufacture of the gas, and a detriment to its illuminating power. Their removal lessens the quantity and impairs the quality of the gas produced. The more rational and economical way of conducting the condensation would seem to consist in effecting it by degrees, in which the condensation of the water and other non-illuminating products from the retorts, and the tarry matter and heavier hydrocarbons, is first accomplished, leaving the lighter hydrocarbons until the last, and subjecting the whole to the action of the gas during the operation, in such a manner that as much of the more volatile hydrocarbon will be taken up by the gas as it is possible for it to hold in solution.

In accordance with the well-known facts of diffusion, that vapors of hydrocarbons with low boiling temperatures will carry portions of others of higher boiling-points, while the latter will retain some of the former at temperatures greater than that of its vaporization, gas at common temperatures will take up and carry a large quantity of the lighter hydrocarbons if it is brought in contact with them after the heavier portions have been condensed, and before they have become cold enough to condense and retain them. The condensation and removal of the heavier compounds at a high temperature, at which they have a strong affinity for naphthaline, will carry off a large portion of the naphthaline, and the hydrocarbon vapor held with the gas will also hold what remains of the crystallizable naphtha in solution, and will thus prevent the deposition of naphthaline in the mains.

The useful vapor, which is ordinarily condensed and held by and with the tar, should be kept vaporous until the water and the tar have been separated, and then as much of it as possible should be combined and carried away with the gas. In this manner the illuminating power of the naphtha, for instance, which is usually separated with the tar, may be retained with the gas, to the improvement of both its quantity and quality.

The object of our invention, therefore, in conformity with these principles, is to effect the condensation and scrubbing, at first under a comparatively high temperature, and without exposure to sudden and rapid cooling, and to divide the matter as it is condensed into a series of films, over and through which the fixed gas must pass. In this manner the heavy and watery portions will be first condensed, and the gas then filtered through them, to dissolve and carry with it, in solution or combined, all the lighter vapor which it is competent to hold.

To attain these objects our invention consists of a shaft, or a series of vertical shafts or compartments, filled with inclined and overlapping plates, from the lower edges of which the condensed matter falls from one to the other, and thus causes the gas to pass through a series of drippings or falling films. By these means the hot gas, tar, and ammonia liquor will be brought thoroughly in contact, so that the gas, in passing through the apparatus, may be freed from most of its naphthaline and other impurities, and enabled to take up the lighter hydrocarbon vapors.

Figure 1 is a side elevation of the apparatus; Fig. 2, an end elevation; Fig. 3, an enlarged section of the diagonal or angular plates. Figs. 4, 5, and 6 are, respectively, longitudinal, transverse, and horizontal sections.

The apparatus may be built with one or more vertical shafts or compartments, and of any suitable dimensions. The higher it is, within practical limits, the more efficient and economical will be its action. In that represented in the drawings there are two compartments, and the passage of the gas is indicated by the arrows. The gas enters at $a$, passes through the passages $b$, between the diagonal or angular plates $c$, through the opening $d$ in the division-plate, and down through the corresponding passages between the similar plates in the next compartment, and makes its exit through the discharge-pipe $e$. The diagonal plates may be of wood or metal, and they may be made in single pieces, as shown in Fig. 3, or be built together in sections or trays, and placed together to form the zigzag passages. The plates should have slightly overlapping edges at the bottom, as at $x$, to insure the drip or fall of the liquid matter on the plate below, and they should be made and placed in such a manner that they can be easily taken out to be cleaned when required.

The shafts or compartments should be fitted with suitable openings, and with connections by which the hot tar and liquor from the hydraulic main, or any other liquid or matter, may be introduced into the apparatus, and also with steam connections, by which the apparatus may be heated and cleaned when necessary; but we make no claim to any of these features, or to corrugated or adjustable plates.

We claim—

The combination of the series of diagonal or inclined and overlapping plates, placed one above the other, forming zigzag passages, extending through a vertical column, substantially as described, for the purpose of causing the gas to pass through a series of falling films of the heavier matter in its course through the passages.

CHARLES VANDERVOORT SMITH.
WILLIAM FARMER.

Witnesses:
DAVID E. GWYNNE,
WM. KEMBLE HALL.